Dec. 24, 1935.  E. MORRIS  2,025,604
FINGER TRAINING DEVICE
Filed July 3, 1934

Inventor

E. Morris

By *Clarence A. O'Brien*
Attorney

Patented Dec. 24, 1935

2,025,604

UNITED STATES PATENT OFFICE 2,025,604

FINGER TRAINING DEVICE

Edward Morris, Albany, N. Y.

Application July 3, 1934, Serial No. 733,664

8 Claims. (Cl. 84—467)

This invention relates to a finger training device expressly designed for use by students of the piano, and has more particular reference to a structure of the portable domestic or home type embodying a dummy keyboard and the multiple assemblage of guides associated therewith.

It is a matter of common knowledge among those teaching the art of piano playing, as well as among the students themselves that special finger technique is a requisite of fine piano playing. The concensus of opinion of the more skillful instructors and teachers tends to promote the adoption and use of an arched formation of the fingers such as is calculated to utilize only the tips of the fingers in striking the keys. As a matter of fact, such fingering is endorsed with a view toward promoting dependable finger activity with resultant skill, facility and dexterity.

Since there is no natural or instinctive ability for the player to resort to this finger tip touch system, I have found it expedient and practicable to provide an artificial or mechanical device which utilizes a dummy keyboard and a series or two groups of guides, each group embodying independently adjustable special finger adapters, and these being capable of assemblage in a manner to provide the necessary muscle building and strength and serving to regulate the fingers of the playing hands in proper relative position necessary to produce the requisite hammer like precision of movement.

More specifically stated, novelty is predicated upon the adoption and use of a dummy keyboard embodying two distinct groups of training devices, that is one group for the left hand and one group for the right hand, these devices being in the nature of guides or adapters and independently and selectively adjustable to provide for requisite arching and shaping and muscle building so that by constant use the student automatically arouses the mental effort necessary to voluntarily retain the fingers in self and ever-set positions for rapidity of successive and selective action.

Figure 1:
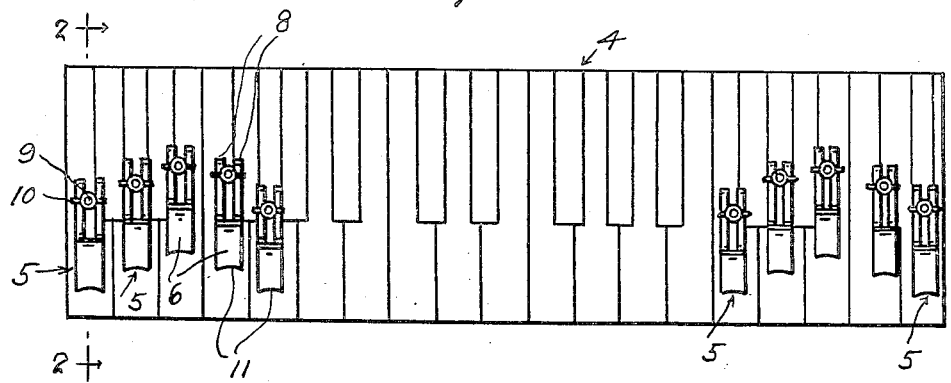
Figure 1 is a top plan view of a device constructed in accordance with the principles of the present invention.
Figure 2:
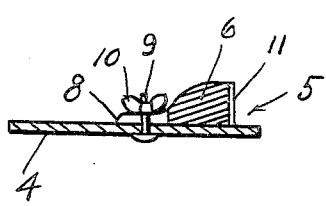
Figure 2 is a transverse section on the line 2—2 of Figure 1.
Figure 3:
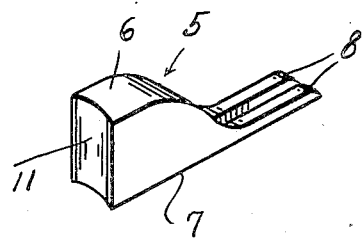
Figure 3 is a perspective view of one of the unique training devices or guides.

In the drawing, in Figure 1, the dummy keyboard is denoted by the numeral 4. This may be of any appropriate dimensions and material. I have found that a light weight wooden properly ornamented board will do. In practice, it may be padded on its bottom so that it may be successfully used on a table or the like for home practicing. The top of the board is obviously diagrammed to represent the black and white keys. As before stated, there are two distinct groups of training devices. Each group embodies five guides or adapters. Each adapter is the same in construction and a description of one will suffice for all. Each adapter is therefore denoted by the numeral 5 in Figure 3. I have discovered that this might well be a wooden block 6 whose effective portion is of appropriate vertical height and dimensions. The bottom is preferably flat as at 7 so that it rests slidably on the dummy keyboard 4. The bottom is fashioned with a pair of fingers 8 which straddle a bolt 9 carrying a thumb nut 10 allowing the entire device to be shifted back and forth to the requisite place. That end of the block which constitutes a rest for the tip of the finger is formed with a vertical groove 11 which is arcuate so as to conform more or less to the fingernail of the abutting finger when the first joint of said finger is properly arched to bring only the tip of the finger against the key. Broadly then, it will be seen that the dummy keyboard is provided with a plurality of these devices 5 shiftable back and forth to requisite relative positions and when the devices of one group are in proper order they define a sort of arcuate line which accounts for the different lengths of the fingers including the thumb.

By placing the fingers in arched positions against these properly adjusted blocks or guides and working the fingers up and down constantly this skillful practicing will soon develop the requisite muscle results needed to train the fingers for permanent shaping and subsequent proper performance.

It will be evident to both teachers and students that this device as a whole possesses certain manifest advantages and features capable of properly training and promoting natural and controllable shaping and movements of the fingers. The device though simple and economical constitutes a satisfactory means which enables standard fingering technique to be satisfactorily taught to students unable to restrain their fingers while practicing legitimate exercises on a regular piano. Through its use, artistic touch and finger drilling is systematically taught.

It is thought that persons skilled in the art to which the invention relates will be able to obtain a clear understanding of the invention after considering the description in connection with the drawing. Therefore, a more lengthy description is regarded as unnecessary.

Minor changes in shape, size, and rearrangement of details coming within the field of invention claimed may be resorted to in actual practice, if desired.

What is claimed is:

1. A structure of the class described comprising a board comprising a base, a finger rest adjustably mounted on said base, said finger rest being of relatively small vertical height and having a vertical guide notch to accommodate the finger nail and terminal end of a finger to permit the latter to be formed into a predetermined shape, raised up and down and exercised and trained for proper fingering technique.

2. An instructive and finger drilling device for teaching piano fingering technique comprising a dummy keyboard having imitation keys, and a plurality of individually adjustable guides mounted on said keyboard, said guides being arranged in two groups, that is, one group for the left hand and one group for the right hand, and said guides each embodying independently and selectively usable block-like finger contacting abutments to facilitate proper arching of the finger-ends.

3. A finger training device of the type described comprising a base, and a block adjustably and detachably mounted on said base, said block including a vertical riser of limited vertical height having its finger-engaged end formed with a vertical groove constituting a guide-way for reception of the finger-nail and first joint of the complemental finger to expedite arching or shaping of the finger end and to regulate and hold the finger end in place as it is moved up and down in said guide-way for exercising purposes.

4. A device of the class described comprising a dummy keyboard and a plurality of finger guides and training devices mounted thereon, each device embodying a shiftable block and said block being formed at one end with finger guiding means to serve as a rest for the end of the finger as well as a guide for the training of the movement of the finger in its up and down directions.

5. A finger drilling and training device for pianists and students comprising a flat board of a portable type having imitation black and white keys and serving as a dummy keyboard, and a plurality of manually adjustable individually usable adapters mounted on said board in coordinated relation with respect to predetermined ones of said imitation keys, each adapter including a vertical grooved riser rising at right angles to said keyboard and functioning as a stop and guide for the adjacent finger.

6. A finger drilling and training device for pianists and students comprising a flat board of a predetermined type having its top fashioned to represent imitation black and white keys, said board serving as a dummy keyboard, and a plurality of individual finger abutments, each abutment comprising a block having a flat bottom slidable on the board, having retaining and adjusting fingers at one end and a vertical riser at its opposite end, said riser constituting a finger abutment and having a groove to accommodate the finger for arching and reciprocating purposes, and fastening devices carried by said board and cooperable with said fingers to allow said finger abutments to be adjusted in relation to each other.

7. A finger drilling and training device for pianists and practicing students comprising a flat board constituting a base, said board being of a portable type to facilitate expeditious practicing and subsequent convenience of storage when not in use, a plurality of individually usable and relatively adjustable guides mounted on the top surface of said board, said guides including attaching portions and upstanding abutment portions, the abutment portions rising vertically from the playing surface of the board, the abutment portion of each guide being vertically grooved to provide a finger tip slideway permitting the adjacent or complemental finger to be pressed forcibly against it and held with sufficient looseness to be worked up and down in a more or less fixed line of travel, the aforesaid plurality of guides comprising two distinct groups, there being five in one group for the fingers and thumb of the right hand, and five in the remaining group for the fingers and thumb of the left hand.

8. A finger drilling and training device for pianists and students designed for teaching a predetermined piano fingering technique calculated to expedite formation of one or more fingers into the proper longitudinal curvature for flexible but precise key-depressing and release action comprising a portable base having a flat surface against which the tip of the finger is struck on the downward stroke, and a manually adjustable finger abutment and guide element mounted on said base, said element including an attaching and adjusting portion and an upstanding finger tip guide.

EDWARD MORRIS.